(No Model.) 2 Sheets—Sheet 1.
S. H. SHORT.
DYNAMO ELECTRIC MACHINE.
No. 506,740. Patented Oct. 17, 1893.
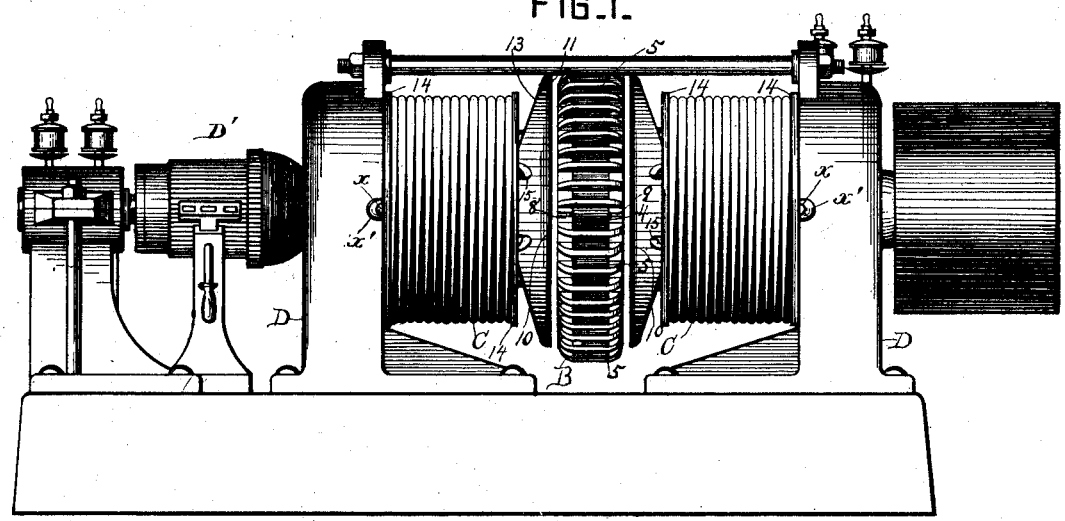
FIG. I.
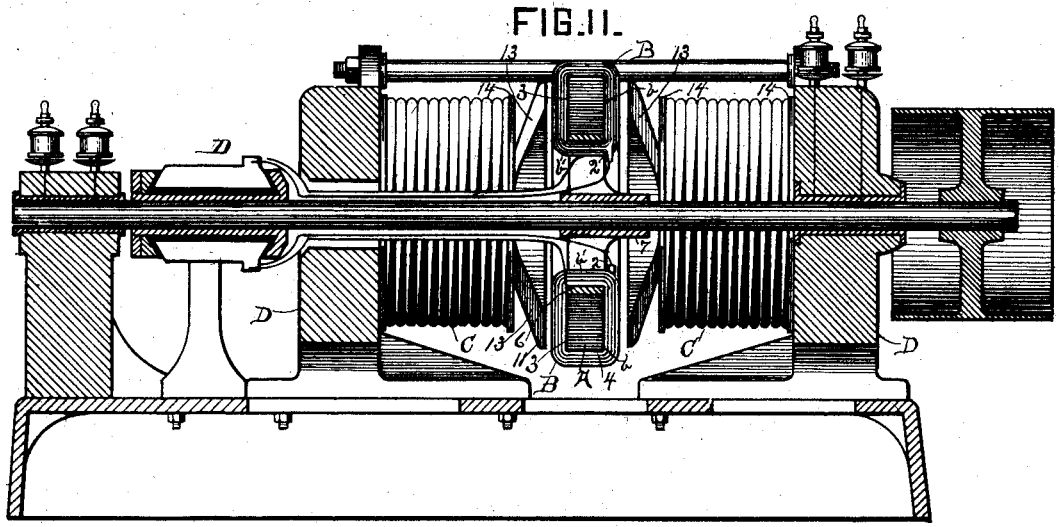
FIG. II.
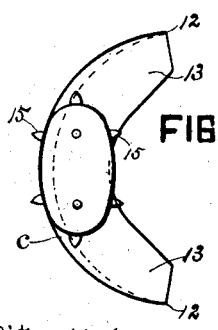
FIG. IV.
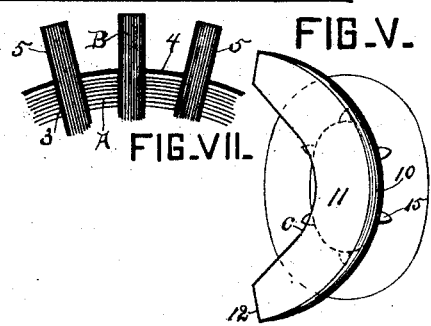
FIG. V.
FIG. VII.
FIG. VI.
Witnesses
R. E. Auld.
G. F. Downing.
Inventor
Sidney H. Short
By H. A. Seymour
Attorney.

(No Model.) 2 Sheets—Sheet 2.
S. H. SHORT.
DYNAMO ELECTRIC MACHINE.
No. 506,740. Patented Oct. 17, 1893.
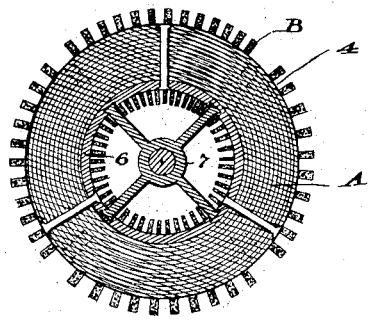
FIG. III
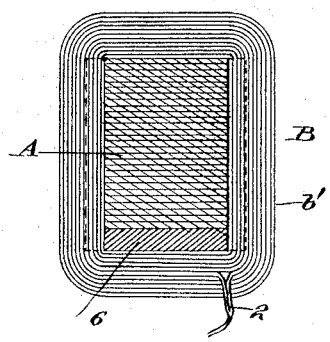
FIG. VIII
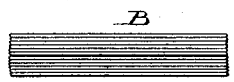
FIG. IX
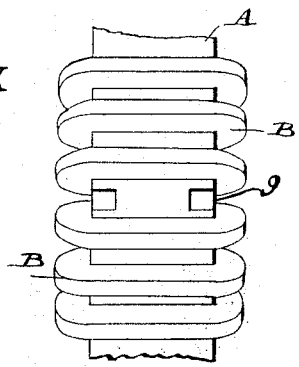
FIG. X
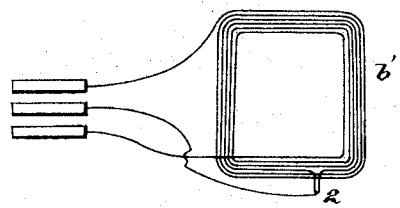
FIG. XI
Witnesses;
Inventor
S. H. Short
By H. A. Seymour
Atty.

United States Patent Office.

SIDNEY H. SHORT, OF CLEVELAND, OHIO, ASSIGNOR TO THE SHORT ELECTRIC RAILWAY COMPANY, OF SAME PLACE.

DYNAMO-ELECTRIC MACHINE.

SPECIFICATION forming part of Letters Patent No. 506,740, dated October 17, 1893.

Application filed April 13, 1891. Serial No. 388,632. (No model.)

*To all whom it may concern:*

Be it known that I, SIDNEY H. SHORT, of Cleveland, in the county of Cuyahoga and State of Ohio, have invented certain new and useful Improvements in Dynamo-Electric Machines; and I do hereby declare the following to be a full, clear, and exact description of the invention, such as will enable others skilled in the art to which it appertains to make and use the same.

This invention relates to that class of dynamo electric machines for use as generators or as motors, which have a series of bobbins arranged around a soft iron ring and connected with the bars of a commutator by conductors leading from the junctions of the bobbins with one another.

In the accompanying drawings which form part of this specification Figure I is an elevation of a dynamo electric machine, in accordance with the invention designed for use as a generator. Fig. II is a central section of the same longitudinally of the armature shaft. Fig. III is a transverse sectional view of the armature. Figs. IV and V are views of one of the field magnet cores. Figs. VI and VII are detached views of the armature. Fig. VIII is a cross section of a portion of the armature on an enlarged scale. Fig. IX is a plan view of the same. Fig. X is an edge view of a portion of the armature. Fig. XI is an enlarged view of one of the bobbins and its connection with the commutator.

The armature is composed of a core A and bobbins B of insulated wire wound in notches in the lateral edges of the core to which the poles of the field magnets C are presented. The notches in the core are made close together and of greater depth than width, and the bobbins which are wound in these notches and project beyond the periphery of the ring, are of less thickness than depth. Thus the bobbins are numerous and their projecting parts resemble flat blades or vanes which in use beat the air and tend strongly to set up a draft of air adapted to cool the metal of the machine. The flatness or small thickness of the bobbins brings all the wires close to the iron of the ring and to the air, so that the heat is quickly dissipated. The dissipation of the heat from the armature coils is very important in machines for electric railway work where currents of large volume are to be generated and where in the case of motors such currents are liable to be passed through stationary or nearly stationary armatures as in starting a car under a heavy load. The effect of the numerous projecting portions as fan vanes co-operates with the readiness of heat conduction afforded by the small thickness of the bobbins in keeping the armature cool. The bobbins may be connected with a commutator of any known or suitable description in any known or suitable way. Practically the bobbins are connected in closed series and conductors are led from the junctions to the bars of a bar commutator D' of the kind employed in the Gramme and similar types of machine. In this connection, a special improvement consists in employing a number (two or more) commutator bars for each of the bobbins in a notch so that in passing the brushes from one phase to the next the whole bobbin is not short circuited but part only. The bobbins could be divided radially so as to form two or more bobbins in a notch, but they would be difficult to wind whereas a peripheral division can easily be accomplished, and serves to reduce materially the tendency to spark. It is evident that both modes of division could be used together if desired. As shown, each bobbin B in a notch of the ring is composed of an inner part $b$ and an outer part $b'$, the whole bobbin being wound on the full width of the notch and a loop 2 being left out at the point between the inside and outside of the bobbin where the peripheral division is to be made. The loop is connected by a suitable conductor with a commutator bar between the two bars with which the ends of the bobbin (or the junctions between bobbins) are connected.

To aid in insulating the bobbins from the core A and at the same time protect them from the abrasion and wear which would follow even a very small movement of the covered wires in contact with the iron of the core, non conducting material 3 is interposed between the bobbins and the walls of the notches in which they are wound. Preferably a lining of tough non conducting material like asbestos, rubber cloth, fibrous material with mica between, vulcanized fiber or the like is used. A strip of insulating material 4 is placed around the periphery of the ring and the coils are wound over it.

A further improvement consists in providing side pieces or casings for the projecting parts of the bobbins of stiff or stiffened material (as vulcanized fiber for example), as at 5. The casing material is preferably bound to the bobbins by cords and cement (such as shellac varnish for example). The casing serves to protect and to brace the projecting portions of the bobbins B.

The core is best made of a soft iron strip wound upon itself and afterward formed with notches in the edges thereof by milling or cutting away the metal. This strip is wound upon a foundation ring 6 and its coils or layers are riveted to each other and to the foundation ring. This latter is fixed on a hub 7 having spokes which enter into grooves in the inner periphery of the ring 6. In order to give room for the spokes teeth 8 of the extra width are made opposite the spokes and in order to equalize the magnetic conditions said teeth are notched or cut away as indicated at 9. Without such notching or cutting away, the teeth 8 would furnish a path of less resistance to the magnetism and the result would be a disturbance of the field whenever they passed in front of the magnets C. The cores of the field magnets C are made of greater thickness than the distance between the exterior and the interior circumferences of the armature core, so as to increase their magnetic capacity, and the outer surfaces 10 of the pole pieces $c$ are sloped so as to make the pole faces 11 equal to said distance and thus to concentrate the lines of force on the ring. The pole pieces have wings 12 which extend around the armature and serve to distribute the lines of force and diminish the magnetic resistance. The backs 13 of these wings are inclined toward the faces 11 so as to make the wings thinner at the ends in order to render the distribution of the lines of force as nearly uniform as may be.

The field magnet cores are secured to a frame D by means of bolts $x$ passing through lugs $x'$ projecting from said cores and the field coils are confined between the said frame and the pole pieces $c$. In order to enable the pole pieces to support more effectually the heads or plates 14 at the outer ends of the said coils, without disturbing the distribution of the magnetism of the field, the said pole pieces are provided with lugs or projections 15 which form bearings or abutments for the said heads or plates. The field magnets may be excited in any known or suitable way as in series or in shunt or by compound winding or by a separate exciter or by a combination of methods.

Any ordinary or suitable construction may be adapted for the parts not particularly described.

Having fully described my invention, what I claim as new, and desire to secure by Letters Patent, is—

1. The rotary armature of a dynamo electric machine composed of an annular core having notches in the sides of greater depth than width and insulated wire bobbins of less thickness than depth wound in said notches and projecting beyond the periphery of the said core, substantially as described.

2. The rotary armature of a dynamo electric machine composed of an annular core having notches in the sides of greater depth than width and insulated wire bobbins of less thickness than depth wound in said notches and projecting beyond the periphery of the said core, in combination with field magnets arranged to present their poles to the sides of said core, and a bar commutator, the said bobbins being connected in closed series and provided with conductors leading to the bars of said commutator, substantially as described.

3. The rotary armature of a dynamo electric machine composed of an annular core having notches in the sides of greater depth than width and insulated wire bobbins of less thickness than depth wound in said notches and projecting beyond the periphery of the said core, in combination with field magnets arranged to present their poles to the sides of said core, and a bar commutator having a number of bars for each bobbin, and said bobbins being connected in closed series and provided with conductors leading to the bars of said commutator from intermediate coils of said bobbins as well as from the junctions between the bobbins, substantially as described.

4. The rotary armature of a dynamo electric machine composed of an annular core having notches in the sides of greater depth than width and insulated wire bobbins of less thickness than depth wound in said notches with a lining of non conducting material between the said bobbins and the walls of the notches, substantially as described.

5. The rotary armature of a dynamo electric machine composed of an annular core having notches in the sides of greater depth than width and insulated wire bobbins of less thickness than depth wound in said notches with a lining of fibrous or tough non conducting material between the said bobbins and the walls of the notches, substantially as described.

6. The rotary armature of a dynamo electric machine composed of an annular core having notches in the sides of greater depth than width and insulated wire bobbins of less thickness than depth wound in said notches and projecting beyond the periphery of the said core and provided with casings or side pieces on the projecting parts of the bobbins, substantially as described.

7. A rotary armature of a dynamo electric machine composed of an annular core having notches in the sides of greater depth than width and insulated wire bobbins of less thickness than depth wound in said notches, the said core being mounted on a hub with spokes and being provided with teeth of extra width opposite said spokes which teeth are grooved or cut away on their faces, substantially as described.

8. The combination with a rotary armature of a dynamo electric machine composed of an annular core having notches in the sides of greater depth than width and insulated wire bobbins of less thickness than depth wound in said notches and projecting beyond the periphery of said core, of field magnets having cores of greater thickness than the distance between the exterior and interior circumferences of said armature core and also having pole pieces sloped on their outer surfaces, and provided with wings, substantially as described.

9. The combination with a rotary armature of a dynamo electric machine composed of an annular core having notches in the sides of greater depth than width and insulated wire bobbins of less thickness than depth wound in said notches and projecting beyond the periphery of said core, of field magnets having cores of greater thickness than the distance between the exterior and interior circumferences of said armature core and winged pole pieces sloped on their outer surfaces, and with the backs of the wings inclined toward the pole faces, substantially as described.

10. In a dynamo machine the combination with the pole pieces of the field magnets, of heads or end plates on said pole pieces, and lugs or projections on the pole pieces adapted to produce bearings or abutments for said heads or end plates, substantially as set forth.

In testimony whereof I have signed this specification in the presence of two subscribing witnesses.

SIDNEY H. SHORT.

Witnesses:
S. G. NOTTINGHAM,
GEORGE F. DOWNING.